United States Patent
Derby et al.

(10) Patent No.: US 10,042,876 B2
(45) Date of Patent: Aug. 7, 2018

(54) SORT-MERGE-JOIN ON A LARGE ARCHITECTED REGISTER FILE

(71) Applicant: International Business Machines Corporation, Armonk, NY (US)

(72) Inventors: Jeffrey H. Derby, Chapel Hill, NC (US); Robert Kevin Montoye, Rochester, MN (US); Dheeraj Sreedhar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 14/488,827

(22) Filed: Sep. 17, 2014

(65) Prior Publication Data

US 2016/0078031 A1 Mar. 17, 2016

(51) Int. Cl.
*G06F 17/30* (2006.01)
*G06F 9/30* (2018.01)

(52) U.S. Cl.
CPC ...... *G06F 17/3033* (2013.01); *G06F 9/30032* (2013.01); *G06F 9/30036* (2013.01); *G06F 17/30097* (2013.01); *G06F 17/30595* (2013.01)

(58) Field of Classification Search
CPC ......... G06F 17/30949; G06F 17/30067; G06F 17/30516; G06F 17/30864; G06F 17/30985; G06F 17/3033; G06F 9/30036; G06F 9/30032; G06F 17/30595; G06F 17/30097; G06F 17/30498; G06F 17/30324; G06F 17/3048
See application file for complete search history.

(56) References Cited

U.S. PATENT DOCUMENTS

| 6,185,557 | B1 * | 2/2001 | Liu | G06F 17/30498 |
| 7,424,591 | B2 * | 9/2008 | Ross | G06F 12/0897 |
| | | | | 711/170 |
| 8,463,820 | B2 | 6/2013 | Chhugani et al. | |
| 8,811,748 | B2 * | 8/2014 | Morris | G06F 17/30241 |
| | | | | 382/156 |

(Continued)

FOREIGN PATENT DOCUMENTS

EP 0421408 A3 10/1991

OTHER PUBLICATIONS

Balkesen, Cagri et al., "Multi-Core, Main-Memory Joins: Sort vs. Hash Revisited", Proceedings of the VLDB Endowment, Sep. 1-5, 2014, Hangzhou, China, 12 pages, vol. 7, No. 1, 2013 VLDB Endowment.

(Continued)

*Primary Examiner* — Scott A Waldron
*Assistant Examiner* — Andalib Lodhi
(74) *Attorney, Agent, or Firm* — Ference & Associates LLC (57) ABSTRACT

Methods and arrangements for joining data sets. There are accepted: a first data set which forms a table in a relational database, and a second data set which forms a table in a relational database, each of the first and second data sets comprising a key value. Each of the first and second data sets is hashed based on the key value, and are thereupon sorted based on the key value. The sorted first and second data sets are joined with one another based on the key value. Other variants and embodiments are broadly contemplated herein.

13 Claims, 7 Drawing Sheets

(56) References Cited

U.S. PATENT DOCUMENTS

| | | | |
|---|---|---|---|
| 8,924,426 B2* | 12/2014 | Chattopadhyay | G06F 17/30445 707/737 |
| 2002/0194157 A1* | 12/2002 | Zait | G06F 17/3033 |
| 2003/0028530 A1* | 2/2003 | Nagaraja | G06F 17/30952 |
| 2006/0218123 A1* | 9/2006 | Chowdhuri | G06F 17/30445 |
| 2011/0066806 A1* | 3/2011 | Chhugani | G06F 7/36 711/118 |
| 2013/0042092 A1 | 2/2013 | Inoue et al. | |
| 2014/0032579 A1* | 1/2014 | Merriman | G06F 17/30345 707/756 |
| 2014/0181477 A1* | 6/2014 | Vaidya | G06F 9/30018 712/208 |
| 2015/0269119 A1 | 9/2015 | Sreedhar et al. | |

OTHER PUBLICATIONS

Blanas, Spyros et al., "Memory Footprint Matters: Efficient Equi-Join Algorithms for Main Memory Data Processing", SoCC'13, Oct. 1-3, 2013, Santa Clara, CA, USA, 16 pages, ACM Digital Library.

Albutiu, Martina-Cezara et al., "Massively Parallel Sort-Merge Joins in Main Memory Multi-Core Database Systems", Proceedings of the VLDB Endowment, Aug. 27-31, 2012, Istanbul, Turkey, pp. 1064-1075, vol. 5, No. 10, 2012 VLDB Endowment.

* cited by examiner

FIG. 7

SORT-MERGE-JOIN ON A LARGE ARCHITECTED REGISTER FILE

BACKGROUND

"Join" algorithms, for combining data from different databases, have steadily gained in importance in the realm of relational databases. Associated computational requirements, however, have resulted in a significant number of procedural bottlenecks. Popular join algorithms have included "hash" join and "sort-merge" join, each presenting characteristic advantages. However, conventional algorithms of all types have consistently fallen short in providing a satisfactory level of computational efficiency, especially for large data sets.

BRIEF SUMMARY

In summary, one aspect of the invention provides a method of joining data sets, said method comprising: utilizing at least one processor to execute computer code configured to perform the steps of: accepting a first data set which forms a table in a relational database; accepting a second data set which forms a table in a relational database; each of the first and second data sets comprising a key value; hashing each of the first and second data sets based on the key value; thereupon sorting each of the first and second data sets based on the key value; and joining the sorted first and second data sets with one another based on the key value.

Another aspect of the invention provides an apparatus comprising: at least one processor; and a computer readable storage medium having computer readable program code embodied therewith and executable by the at least one processor, the computer readable program code comprising: a computer readable storage medium having computer readable program code embodied therewith, the computer readable program code comprising: computer readable program code configured to accept a first data set which forms a table in a relational database; computer readable program code configured to accept a second data set which forms a table in a relational database; each of the first and second data sets comprising a key value; computer readable program code configured to hash each of the first and second data sets based on the key value; computer readable program code configured to thereupon sort each of the first and second data sets based on the key value; and computer readable program code configured to join the sorted first and second data sets with one another based on the key value.

An additional aspect of the invention provides a computer program product comprising: a computer readable storage medium having computer readable program code embodied therewith, the computer readable program code comprising: computer readable program code configured to accept a first data set which forms a table in a relational database; computer readable program code configured to accept a second data set which forms a table in a relational database; each of the first and second data sets comprising a key value; computer readable program code configured to hash each of the first and second data sets based on the key value; computer readable program code configured to thereupon sort each of the first and second data sets based on the key value; and computer readable program code configured to join the sorted first and second data sets with one another based on the key value.

A further aspect of the invention provides a method comprising: accepting a first data set which forms a table in a relational database; accepting a second data set which forms a table in a relational database; each of the first and second data sets comprising a key value; hashing each of the first and second data sets based on the key value; said hashing comprising: performing a hash across SIMD lanes of each of the first and second data sets based on the key value; and partitioning the data sets into disjoint sets; thereupon sorting each of the first and second data sets based on the key value; and joining the sorted first and second data sets with one another based on the key value.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIG. 1-6. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 7. In accordance with an exemplary embodiment, most if not all of the process steps, components and outputs discussed with respect to FIGS. 1-6 can be performed or utilized by way of a processing unit or units and system memory such as those indicated, respectively, at 16' and 28' in FIG. 7, whether on a server computer, a client computer, a node computer in a distributed network, or any combination thereof.

Broadly contemplated herein, in accordance with at least one embodiment of the invention, are methods and arrangements which use SIMD (single instruction, multiple data) for all stages in sort-merge-join. This can build on an effective algorithm for sorting in SIMD lanes (e.g., see FIG. 2 and its attendant discussion herebelow). However, unlike an algorithm in which solely sorting is involved, methods as broadly contemplated herein do not require merging across SIMD lanes, thus reducing the costs of sorting. Additionally, there are broadly contemplated herein methods and arrangements involving a hash across SIMD lanes in two data tables being merged, wherein the SIMD lanes of both tables are joined in parallel. To this latter end, a tailored approach can be involved, with no data-dependent branching required. It will be appreciated that arrangements as broadly contemplated herein offer faster performance than conventional arrangements and can be generalized to a great variety of vector processors. These and other features relating to at least one embodiment of the invention will be better appreciated from the discussion which follows.

Figure 1:
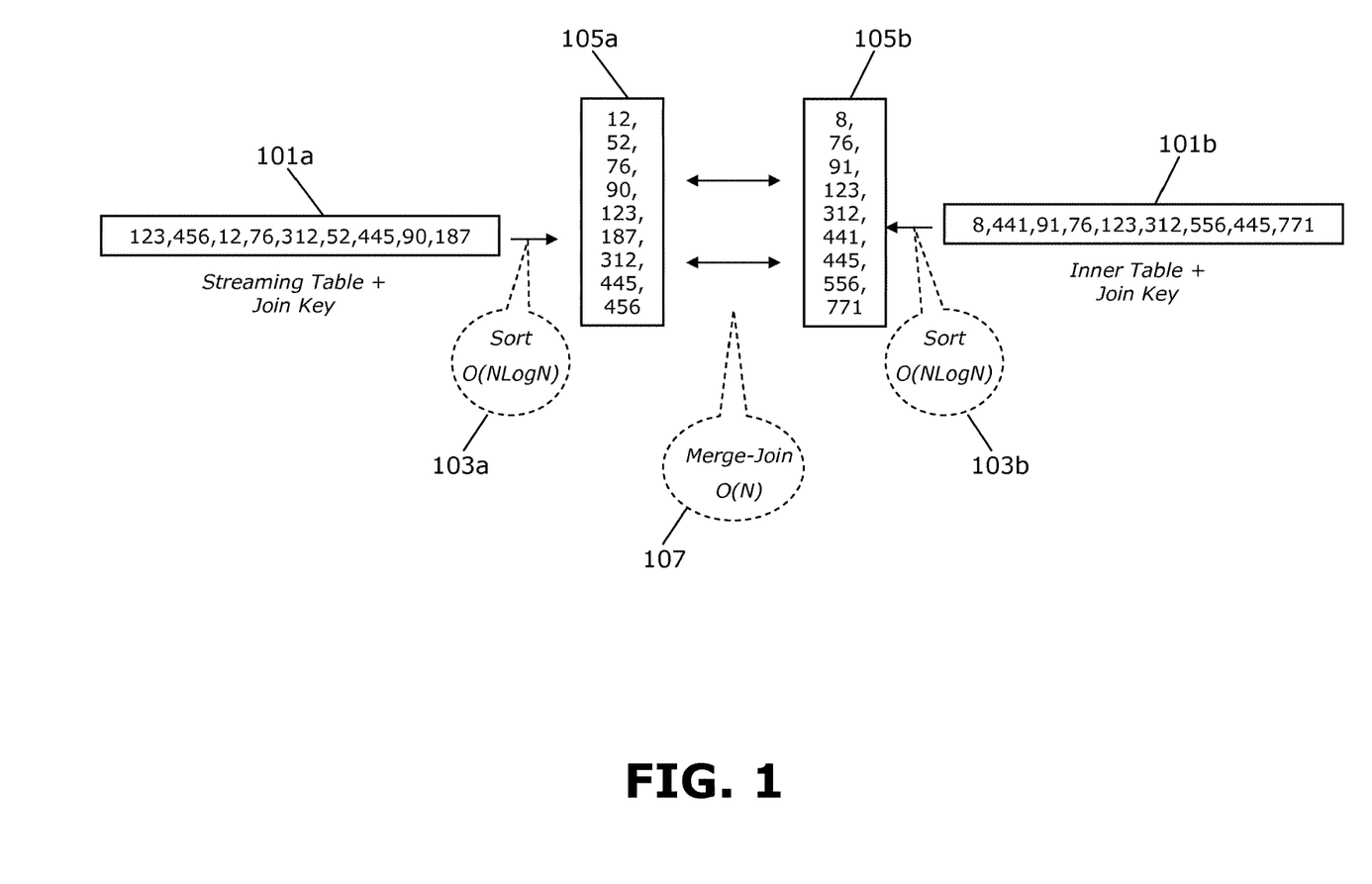
FIG. 1 schematically illustrates a simple sort-merge join process.

Generally, in a context according to at least one embodiment of the invention, it can be appreciated that hash join is an O(n), or linear, process but displays severe memory access latency, especially in the case of larger tables, as compared to sort-merge join, which involves an O(n log n), or linearithmic process. In other words, in an O(n) process, execution time and resources can be expected roughly in proportion to the length or size n of an assimilated data set, while in an O(n log n) process this can be expected in proportion to n times the logarithm of the quantity n. FIG. 1 schematically illustrates a simple sort-merge join process involving two data sets (101*a/b*), each of which forms a table in a relational database that itself includes a key (value) and payload. For the purposes of the present discussion, the term "streaming table" refers to a first of the two data sets (101*a*) while "inner table" refers to a second of the two data sets (101*b*). The tables are sorted (103*a/b*, respectively), and the sorted tables (105*a/b*, respectively) are then joined (107) based on the key value. A key value, as generally known, represents a unique identifier with respect to a data set, and can be utilized in processes of joining data sets.

Figure 2:
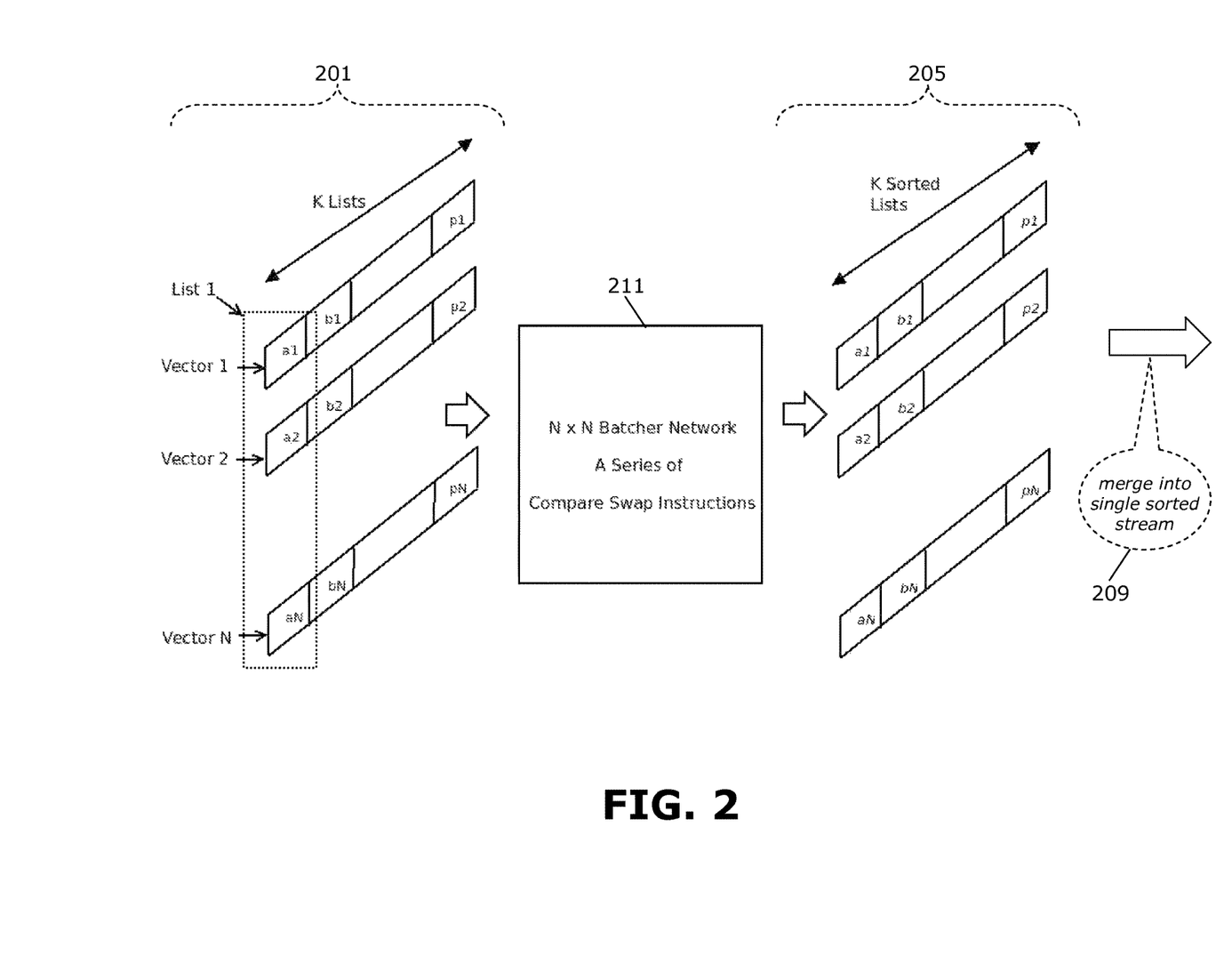
FIG. 2 illustrates a process of sorting SIMD lanes over several vectors.
Figure 3:
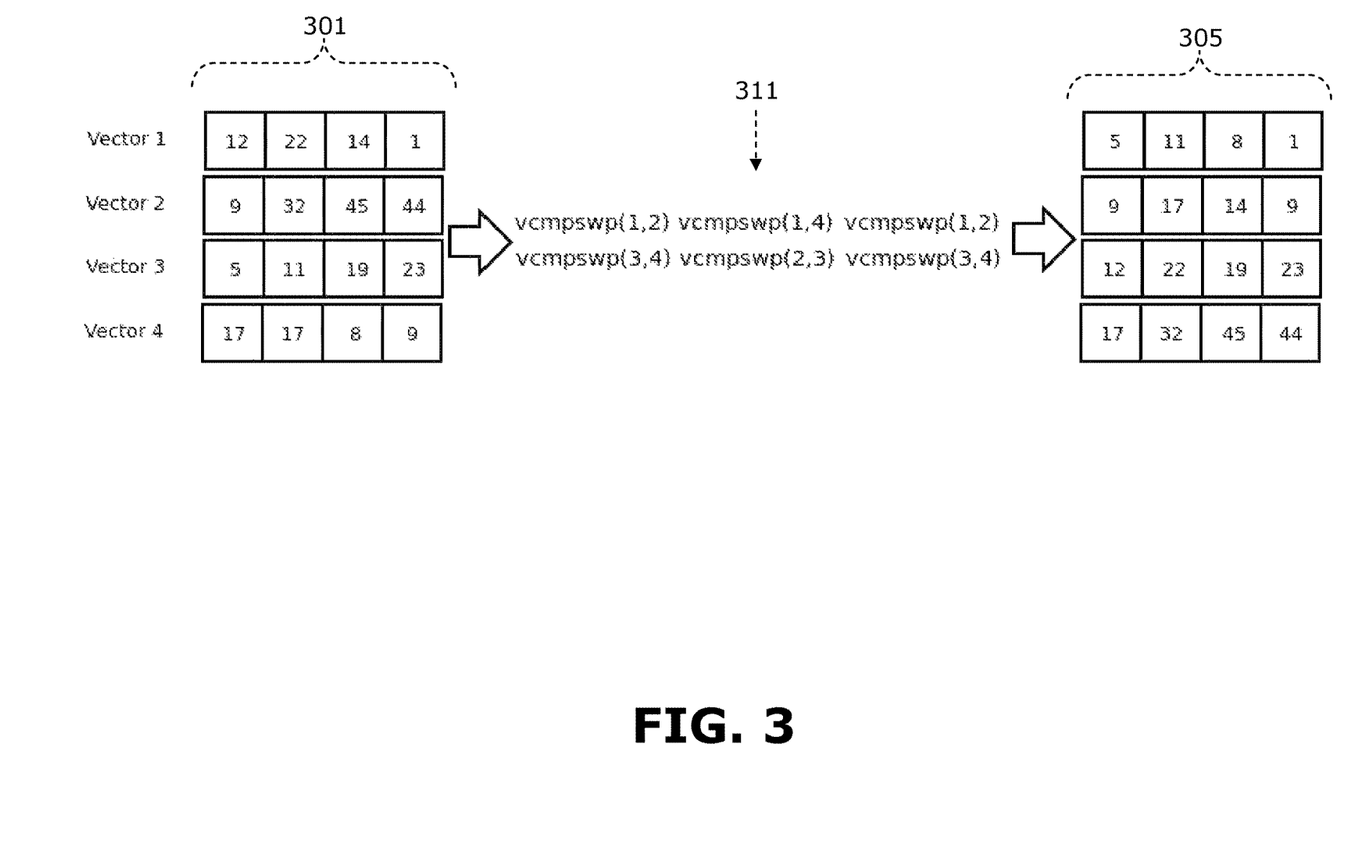
FIG. 3 illustrates a working example of the process of FIG. 2

In accordance with a context of at least one embodiment of the invention, as shown in FIG. 2, each SIMD lane over several vectors of an input data set 201 can be sorted. (The process shown in FIG. 2 is provided by way of illustrative example. Further details thereof may be found in the co-pending and commonly assigned U.S. patent application Ser. No. 14/219,391, filed Mar. 19, 2014, "Merging and Sorting Arrays on an SIMD Processor"; this referenced U.S. patent application is incorporated by reference herein.) Once each lane (or "list") is sorted (205), the lanes may then be merged into a single sorted stream (209). An intermediate step involves a set of compare-swap instructions (211). A working example is shown in FIG. 3, with relation to a 4×4 vector, with an input set (301), an intermediate compare-swap step (311) and an output sorted list (305). As will be appreciated from further discussion herebelow, it has been found that, in the context of sort-merge join, significant gains in processing speed can be achieved if the last step in FIG. 2, involving a merge into a single sorted steam (209), can be avoided.

Figure 4:
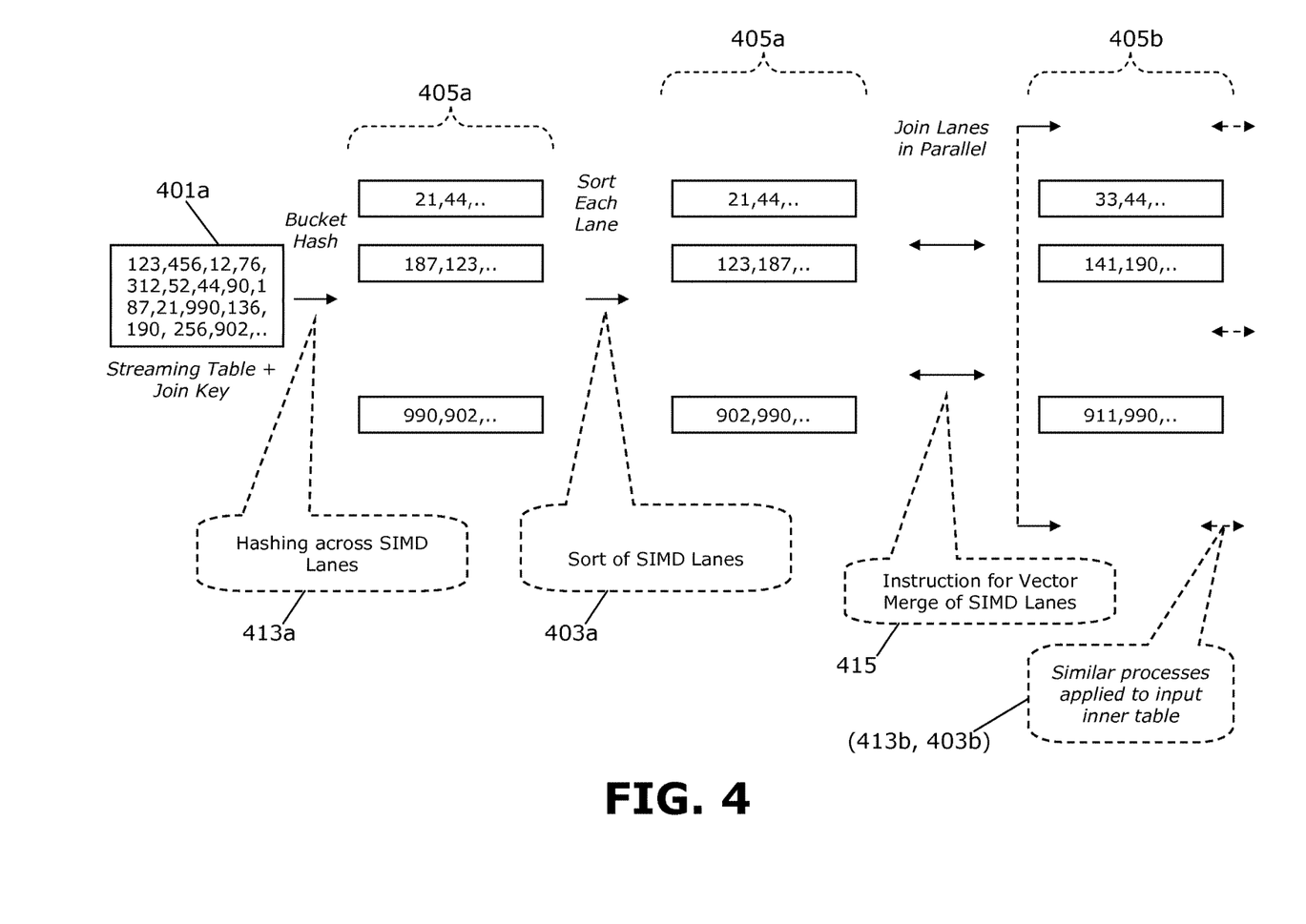
FIG. 4 illustrates a sort-merge join process incorporating an additional hashing step and a modified join step.

As such, as schematically illustrated in FIG. 4, in accordance with at least one embodiment of the invention, an additional hashing step is incorporated before a sorting step, and a modified join step (with vector merge) is employed. As shown, a bucket hash (413*a*) is applied to an input streaming table 401*a*, to hash across SIMD lanes and yield a pre-sorted table 405*a*. Lanes are then sorted (403*a*), e.g., in a manner such as that discussed with respect to FIGS. 2 and 3. Similar (hashing and sorting) steps are undertaken with respect to an inner table (413*b*, 403*b*). Finally, lanes of the sorted streaming table and sorted inner table are joined in parallel via an instruction for vector merge of SIMD lanes (415).

In accordance with a t least one embodiment of the invention, a simple join operation of two sorted arrays x[ ] and y[ ] can be accomplished as follows (by way of an illustrative and non-restrictive example):

```
i = 0, j = 0;
If x[ i ] == y[ j ]
{
        push x[ i ]
}
If x[ i ] >= y[ j ]
        j++
else
        i++
```

Figure 5:
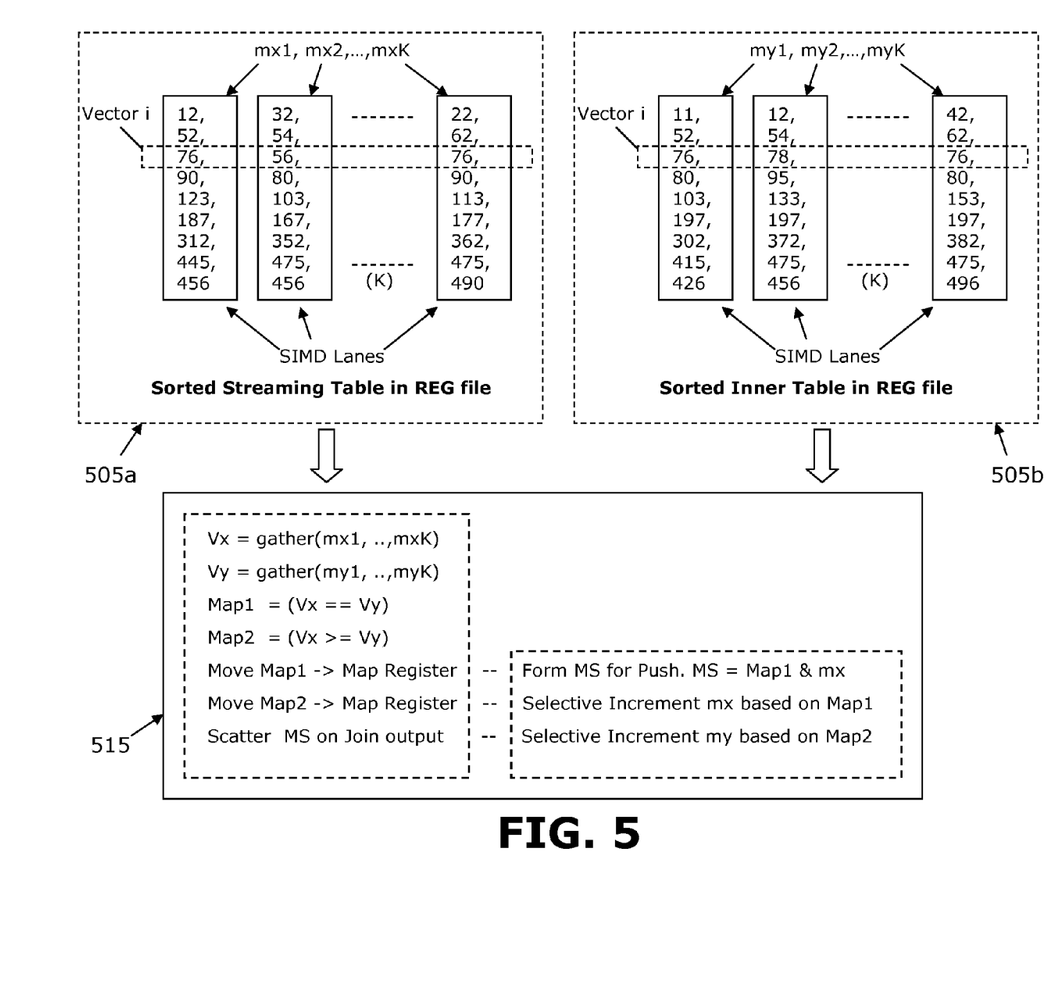
FIG. 5 schematically illustrates a vector join of multiple lanes.

Further, the vector merge of multiple lanes, i.e., joining multiple arrays in parallel in SIMD lanes (referenced in FIG. 4) can take place as illustrated in FIG. 5.

As such, by way of a working example in accordance with at least one embodiment of the invention, FIG. 5 illustrates a vector join of multiple lanes, with a sorted streaming table (505*a*) and a sorted inner table (505*b*), to which vector instruction and map managing instructions (515) are applied. The vector mx=[mx1, . . . , mxK] points to the top of the stack in each of the SIMD lane of the sorted streaming table (where K represents the SIMD width). Similarly the vector my=[my1, . . . , myK] points to the top of the stack in each of the SIMD lanes of the sorted inner table. The gather operation, at 515, collects the top of each stack into a single vector (Vx and Vy). The mx and my vectors are selectively incremented based on the maps M1 and M2, where: M1[i]=1 if Vx[i]=Vy[i], and 0 otherwise; and M2[i]=1 if (Vx[i]>=Vy[i]), and 0 otherwise.

In accordance with at least one embodiment of the invention, quantitative values as determined herein (e.g., a final data set resulting from joining different data sets within one another) can be stored in memory or displayed to a user on a screen, as might fit the needs of one or more users.

Figure 6:
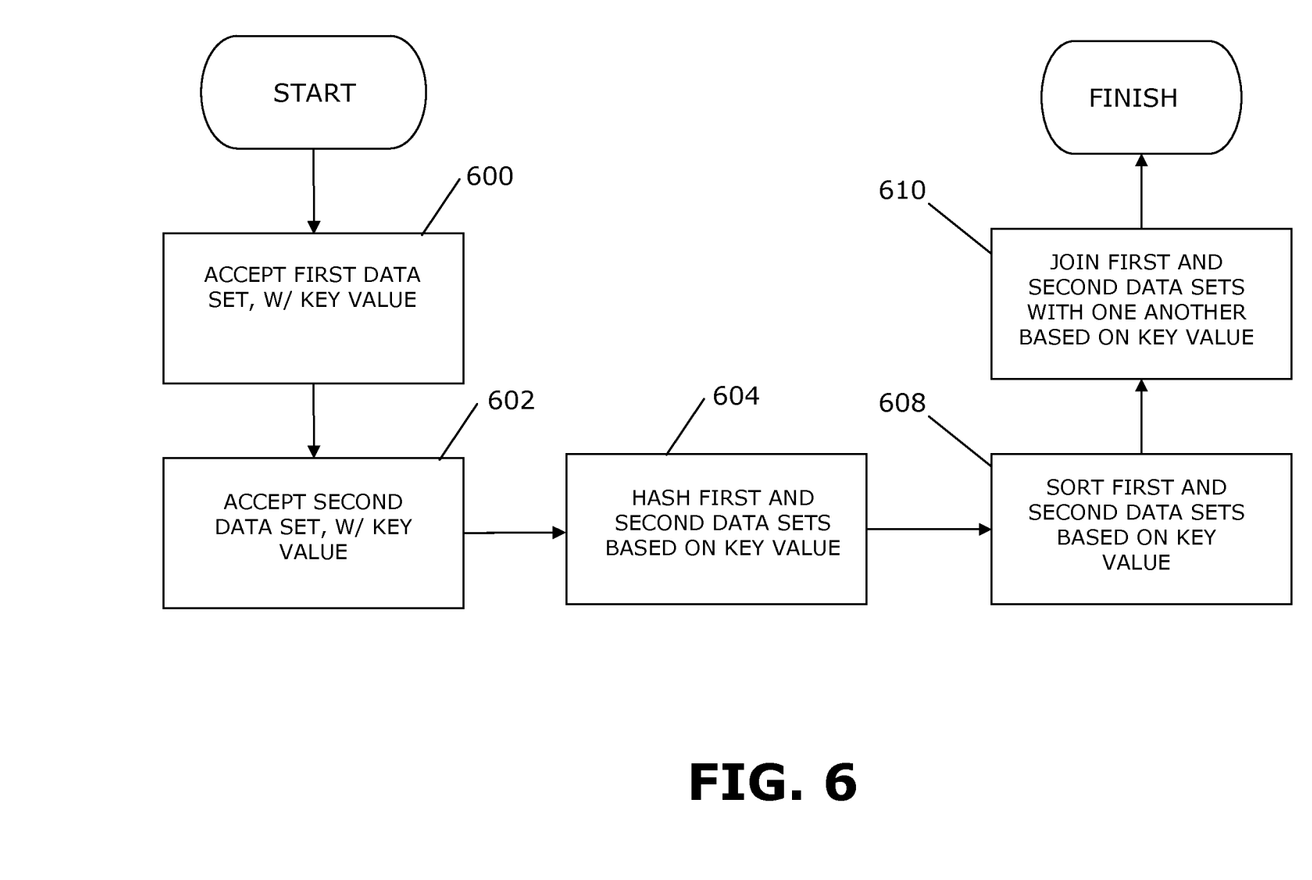
FIG. 6 sets forth a process more generally for joining data sets.

FIG. 6 sets forth a process more generally for joining data sets, in accordance with at least one embodiment of the invention. It should be appreciated that a process such as that broadly illustrated in FIG. 6 can be carried out on essentially any suitable computer system or set of computer systems, which may, by way of an illustrative and non-restrictive example, include a system such as that indicated at 12' in FIG. 7. In accordance with an example embodiment, most if not all of the process steps discussed with respect to FIG. 6 can be performed by way of a processing unit or units and system memory such as those indicated, respectively, at 16' and 28' in FIG. 7.

As shown in FIG. 6, in accordance with at least one embodiment of the invention, there are accepted: a first data set which forms a table in a relational database (600), and a second data set which forms a table in a relational database (602), each of the first and second data sets comprising a key value. Each of the first and second data sets is hashed based on the key value (604), and are thereupon sorted based on the key value (606). The sorted first and second data sets are joined with one another based on the key value (608).

Figure 7:
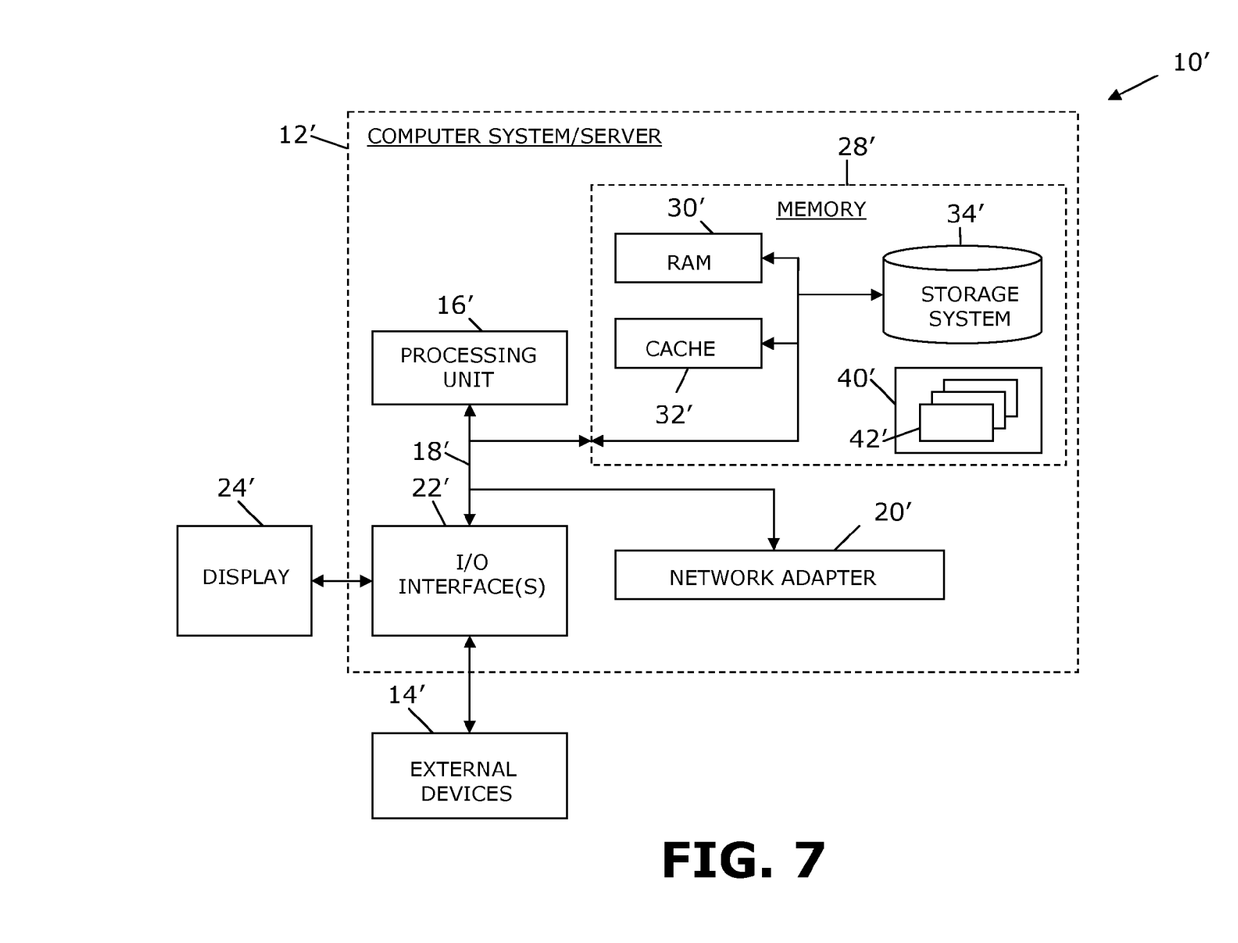
FIG. 7 illustrates a computer system.

Referring now to FIG. 7, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited took, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of joining data sets, said method comprising:
utilizing at least one processor to execute computer code configured to perform the steps of:
accepting a first data set which forms a streaming table in a relational database and wherein the first data set comprises a plurality of unsorted single instruction, multiple data (SIMD) lanes;
accepting a second data set which forms an inner table in the relational database and wherein the second data set comprises a plurality of unsorted single instruction, multiple data (SIMD) lanes;
each of the streaming table and the inner table comprising a corresponding key value;
yielding a streaming pre-sorted table from the unsorted SIMD lanes of the streaming table by hashing the first data set based on the key value of the streaming table, wherein the hashing comprises applying a bucket hash to the first data set across the plurality of unsorted SIMD lanes of the first data set, wherein the streaming pre-sorted table comprises a table comprising a plurality of unsorted SIMD lanes that are unsorted with respect to other SIMD lanes within the streaming pre-sorted table and wherein each lane comprises a set of sorted data values that are sorted with respect to each other data value within the lane;
sorting the plurality of unsorted SIMD lanes with respect to the other SIMD lanes of the streaming table based on the key value of the streaming table;
yielding an inner pre-sorted table from the unsorted SIMD lanes of the inner table by hashing the second data set based on the key value of the inner table, wherein the hashing comprises applying a bucket hash to the second data set across the plurality of unsorted SIMD lanes of the second data set, wherein the inner pre-sorted table comprises a table comprising a plurality of unsorted SIMD lanes that are unsorted with respect to other SIMD lanes within the inner pre-sorted table and wherein each lane comprises a set of sorted data values that are sorted with respect to each other data value within the lane;
sorting the plurality of unsorted SIMD lanes with respect to the other SIMD lanes of the inner table based on the key value of the inner table; and
joining, in parallel, the sorted streaming table and the sorted inner table with one another based on a primary key value corresponding to the relational database, wherein the joining comprises using a vector merge technique to join the sorted SIMD lanes of the streaming table and the sorted SIMD lanes of the inner table, wherein the vector merge technique comprises using a vector pointer that initially points to a top data value of each SIMD lane in the sorted streaming table and another vector pointer that initially points to a top data value of each SIMD lane in the sorted inner table, gathering each of the top data points pointed to by the vector pointer and the another vector pointer into a single vector, and incrementing the pointing position of one of: the vector pointer and the another vector pointer based upon a comparison between the data values pointed to by the vector pointer and the data values pointed to by the another vector pointer within the single vector.

2. The method according to claim 1, wherein said hashing comprises performing a hash across single instruction, multiple data (SIMD) lanes of each of the streaming table and inner table based on the primary key value.

3. The method according to claim 1, wherein said hashing comprises partitioning the data sets into disjoint sets.

4. The method according to claim 1, wherein each of the first and second data sets comprise a payload.

5. An apparatus comprising:
at least one processor; and
a computer readable storage medium having computer readable program code embodied therewith and executable by the at least one processor, the computer readable program code comprising:
a computer readable storage medium having computer readable program code embodied therewith, the computer readable program code comprising:
computer readable program code configured to accept a first data set which forms a streaming table in a relational database and wherein the first data set comprises a plurality of unsorted single instruction, multiple data (SIMD) lanes;
computer readable program code configured to accept second data set which forms an inner table in the relational database and wherein the second data set comprises a plurality of unsorted single instruction, multiple data (SIMD) lanes;
each of the streaming table and inner table comprising a corresponding key value;
computer readable program code configured to yield a streaming pre-sorted table from the unsorted SIMD lanes of the streaming table by hashing the first data set based on the key value of the streaming table, wherein the hashing comprises applying a bucket hash to the first data set across the plurality of unsorted SIMD lanes of the first data set, wherein the streaming pre-sorted table comprises a table comprising a plurality of unsorted SIMD lanes that are unsorted with respect to other SIMD lanes within the streaming pre-sorted table and wherein each lane comprises a set of sorted data values that are sorted with respect to each other data value within the lane;
computer readable program code configured to sort the plurality of unsorted SIMD lanes with respect to the other SIMD lanes of the first data set based on the key value of the streaming table;
computer readable program code configured to yield an inner pre-sorted table from the unsorted SIMD lanes of the inner table by hashing the second data set based on the key value of the inner table, wherein the hashing comprises applying a bucket hash to the second data set across the plurality of unsorted SIMD lanes of the second data set, wherein the inner pre-sorted table comprises a table comprising a plurality of unsorted SIMD lanes that are unsorted with respect to other SIMD lanes within the inner pre-sorted table and wherein each lane comprises a set of sorted data values that are sorted with respect to each other data value within the lane;
computer readable program code configured to sort the plurality of unsorted SIMD lanes with respect to the other SIMD lanes of the second data set based on the key value of the inner table; and
computer readable program code configured to join, in parallel, the sorted streaming table and the sorted inner table with one another based on a primary key value corresponding to the relational database, wherein the joining comprises using a vector merge technique to join the sorted SIMD lanes of the streaming table and the sorted SIMD lanes of the inner table, wherein the vector merge technique comprises using a vector pointer that initially points to a top data value of each SIMD lane in the sorted streaming table and another vector pointer that initially points to a top data value of each SIMD lane in the sorted inner table, gathering each of the top data points pointed to by the vector pointer and the another vector pointer into a single vector, and incrementing the pointing position of one of: the vector pointer and the another vector pointer based upon a comparison between the data values pointed to by the vector pointer and the data values pointed to by the another vector pointer within the single vector.

6. The apparatus according to claim 5, wherein the hashing comprises performing a hash across single instruction, multiple data (SIMD) lanes of each of the first and second data sets based on the primary key value.

7. The apparatus according to claim 5, wherein the hashing comprises partitioning the data sets into disjoint sets.

8. The apparatus according to claim 5, wherein each of the first and second data sets comprise a payload.

9. A computer program product comprising:
a non-transitory computer readable storage medium having computer readable program code embodied therewith, the computer readable program code comprising:
computer readable program code configured to accept a first data set which forms a streaming table in a relational database and wherein the first data set comprises a plurality of unsorted single instruction, multiple data (SIMD) lanes;
computer readable program code configured to accept second data set which forms an inner table in the relational database and wherein the second data set comprises a plurality of unsorted single instruction, multiple data (SIMD) lanes;
each of the streaming table and inner table comprising a corresponding key value;
computer readable program code configured to yield a streaming pre-sorted table from the unsorted SIMD lanes of the streaming table by hashing the first data set based on the key value of the streaming table, wherein the hashing comprises applying a bucket hash to the first data set across the plurality of unsorted SIMD lanes of the first data set, wherein the streaming pre-sorted table comprises a table comprising a plurality of unsorted SIMD lanes that are unsorted with respect to other SIMD lanes within the streaming pre-sorted table and wherein each lane comprises a set of sorted data values that are sorted with respect to each other data value within the lane;
computer readable program code configured to sort the plurality of unsorted SIMD lanes with respect to the other SIMD lanes of the first data set based on the key value of the streaming table;
computer readable program code configured to yield an inner pre-sorted table from the unsorted SIMD lanes of the inner table by hashing the second data set based on the key value of the inner table, wherein the hashing comprises applying a bucket hash to the second data set across the plurality of unsorted SIMD lanes of the second data set, wherein the inner pre-sorted table comprises a table comprising a plurality of unsorted SIMD lanes that are unsorted with respect to other SIMD lanes within the inner pre-sorted table and wherein each lane comprises a set of sorted data values that are sorted with respect to each other data value within the lane;

computer readable program code configured to sort the plurality of unsorted SIMD lanes with respect to the other SIMD lanes of the second data set based on the key value of the inner table; and
computer readable program code configured to join, in parallel, the sorted streaming table and the sorted inner table with one another based on a primary key value corresponding to the relational database, wherein the joining comprises using a vector merge technique to join the sorted SIMD lanes of the streaming table and the sorted SIMD lanes of the inner table, wherein the vector merge technique comprises using a vector pointer that initially points to a top data value of each SIMD lane in the sorted streaming table and another vector pointer that initially points to a top data value of each SIMD lane in the sorted inner table, gathering each of the top data points pointed to by the vector pointer and the another vector pointer into a single vector, and incrementing the pointing position of one of: the vector winter and the another vector pointer based upon a comparison between the data values pointed to by the vector pointer and the data values pointed to by the another vector pointer within the single vector.

10. The computer program product according to claim 9, wherein the hashing comprises performing a hash across single instruction, multiple data (SIMD) lanes of each of the streaming table and inner table based on the primary key value.

11. The computer program product according to claim 9, wherein the hashing comprises partitioning the data sets into disjoint sets.

12. The computer program product according to claim 9, wherein each of the first and second data sets comprise a payload.

13. A method comprising:
utilizing at least one processor to execute computer code configured to perform the steps of:
accepting a first data set which forms a streaming table in a relational database and wherein the first data set comprises a plurality of unsorted single instruction, multiple data (SIMD) lanes;
accepting a second data set which forms an inner table in the relational database and wherein the second data set comprises a plurality of unsorted single instruction, multiple data (SIMD) lanes;
each of the streaming table and inner table comprising a corresponding key value and the relational database comprising a corresponding key value;
yielding a streaming pre-sorted table and an inner pre-sorted table from the unsorted SIMD lanes of the streaming table and the unsorted SIMD lanes of the inner table, respectively, by hashing each of the first and second data sets based on the key value of the streaming table and the key value of the inner table, respectively, wherein the hashing comprises applying a bucket hash to each of the streaming table across the plurality of unsorted SIMD lanes of the streaming table and the inner table across the plurality of unsorted SIMD lanes of the inner table, wherein each of the streaming pre-sorted table and the inner presorted table comprise a table comprising a plurality of unsorted SIMD lanes that are unsorted with respect to other SIMD lanes within the pre-sorted table and wherein each lane comprises a set of sorted data values that are sorted with respect to each other data value within the lane;

said hashing comprising:
- performing a hash across the plurality of the unsorted SIMD lanes of each of the streaming table and inner table based on the key value corresponding to each of the streaming table and the inner table; and
- partitioning the data sets into disjoint sets;

thereupon sorting the plurality of unsorted SIMD lanes with respect to the other SIMD lanes of both the streaming table and inner table based on the key value corresponding to each of the streaming table and the inner table; and joining, in parallel, the sorted streaming table and the sorted inner table with one another based on the key value corresponding to the relational database, wherein the joining comprises using a vector merge technique to join the sorted SIMD lanes of the streaming table and the sorted SIMD lanes of the inner table, wherein the vector merge technique comprises using a vector pointer that initially points to a top data value of each SIMD lane in the sorted streaming table and another vector pointer that initially points to a top data value of each SIMD lane in the sorted inner table, gathering each of the top data points pointed to by the vector pointer and the another vector pointer into a single vector, and incrementing the pointing position of one of: the vector pointer and the another vector pointer based upon a comparison between the data values pointed to by the vector pointer and the data values pointed to by the another vector pointer within the single vector.

* * * * *